Aug. 4, 1936.  A. O. McCOLLUM  2,049,656
BRAKE
Filed April 14, 1934  2 Sheets-Sheet 1
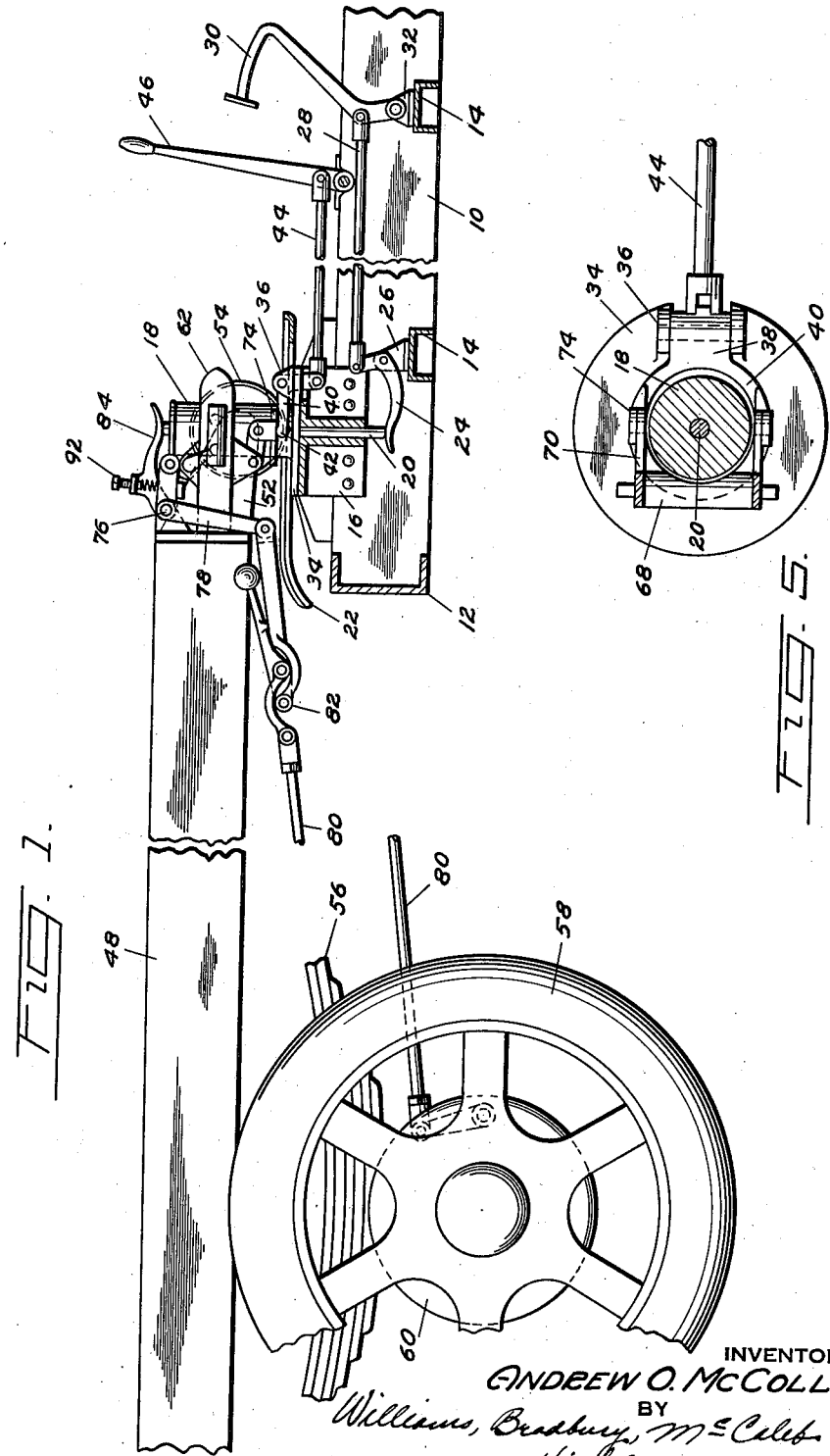

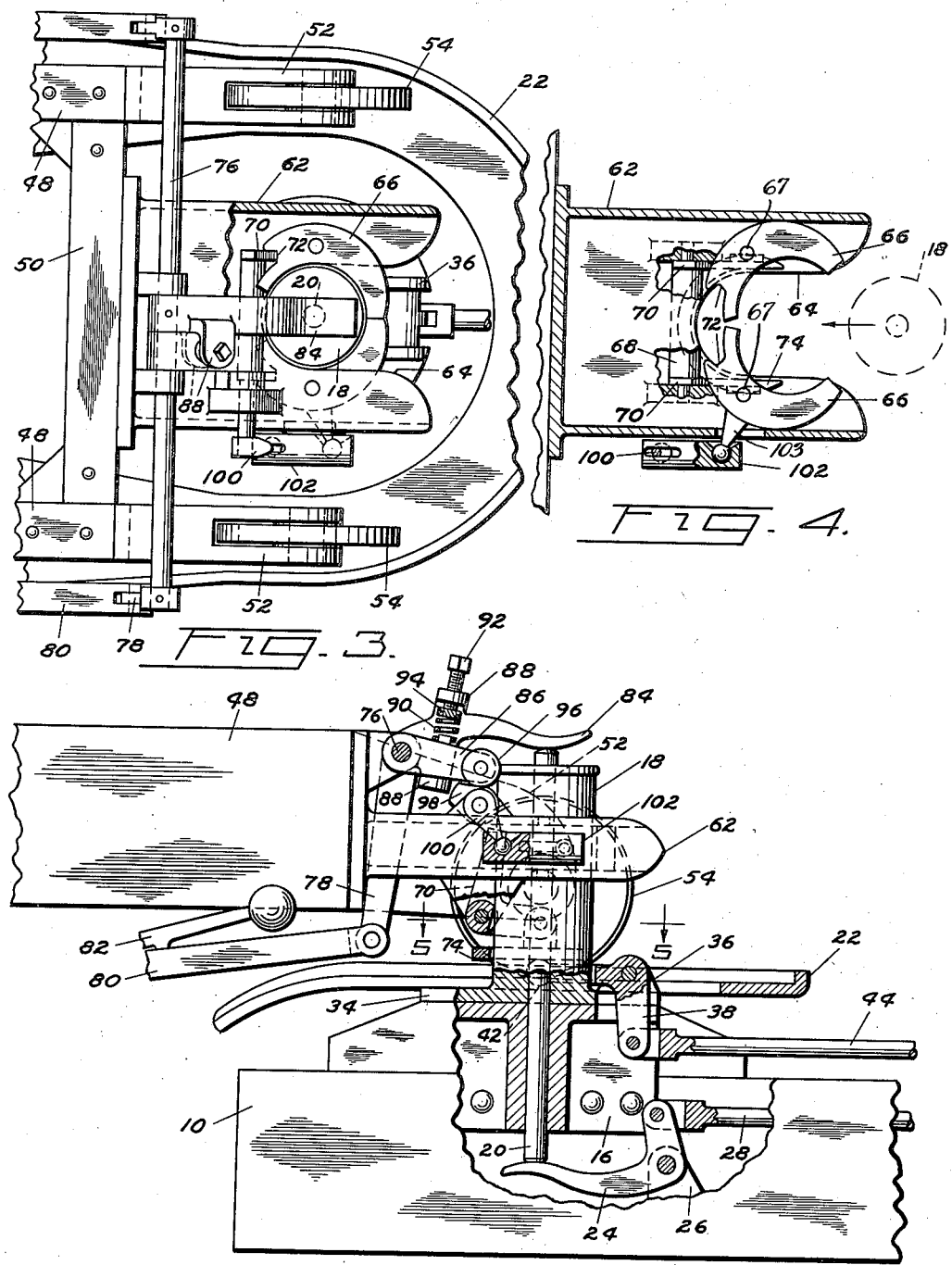

Patented Aug. 4, 1936

2,049,656

UNITED STATES PATENT OFFICE 2,049,656

BRAKE

Andrew O. McCollum, Detroit, Mich., assignor to Hydraulic Brake Company, Detroit, Mich., a corporation of California Application April 14, 1934, Serial No. 720,506

2 Claims. (Cl. 188—3)

This invention relates to brakes, and more particularly to parking brakes.

An object of the invention is to provide an effective parking brake for motor vehicles having means compensating for variations in effectiveness of the brakes.

Another object of the invention is to provide a parking brake for a semi-trailer automatically operated upon uncoupling the trailer from a tractor.

With these objects in view which may be incident to my improvements, the invention consists in the particular combination to be hereinafter set forth and claimed, with the understanding that the several necessary elements comprising the invention may be varied in construction, proportion and arrangement without departing from the spirit and scope of the appended claims.

In order to make the invention more clearly understood, I have shown in the accompanying drawings means for carrying the same into practical effect, without limiting the improvements in their useful application to the particular constructions which, for the purpose of explanation, have been made the subject of illustration.

In the drawings forming a part of this specification,—

Figure 1 is a side elevation of a tractor and a semi-trailer coupled thereto and equipped with a brake structure embodying the invention;

Figure 2 is a side elevation partly in section and partly broken away, illustrating the coupling and braking mechanism;

Figure 3 is a top plan view partly in section and partly broken away illustrating the coupling in closed position;

Figure 4 is a fragmentary view illustrating the coupling in open position; and

Figure 5 is a sectional view substantially on line 5—5, Figure 2.

In the drawings forming a part of this specification, 10 represents the side members of a motor vehicle chassis frame. The side members are connected by an end member 12 and cross-members 14 and a relatively heavy cross-member 16 which extends above the frame.

The cross-member 16 has thereon a king pin 18 axially bored for the reception of a thrust pin 20. A track 22 is mounted on cross-member 16. A bell crank lever 24, pivoted on a bracket 26 on one of the cross-members 14 of the frame, has one of its legs engaging the thrust pin 20 and its other leg connected by a rod 28 to a foot pedal lever 30 pivoted to a bracket 32 on one of the cross-members 14 of the frame.

The base of the king pin 18 includes a flange 34 supporting a bracket 36. A bell crank lever 38 is pivotally suspended on the bracket 36. One leg of this bell crank lever includes a yoke 40 embracing the king pin, and the ends of the yoke are spherical as indicated at 42. The other leg of the bell crank lever is connected by a rod 44 to a hand lever 46 pivoted on the frame.

A semi-trailer coupled to the tractor includes a frame comprising side members 48 connected by an end member 50. The side members are extended beyond the end member to provide supports 52 for correspondingly oppositely disposed rollers 54 adapted to travel on the tracks 22 and to support the forward end of the frame in proper relation to the king pin. The rear end of the trailer is supported by springs 56 seated on an axle, not shown, having mounted thereon wheels 58 equipped with brakes 60.

The rollers 54 facilitate in coupling the trailer to the tractor, and when the trailer and tractor are coupled the rollers are diametrically disposed to the king pin. Accordingly, upon effecting a turn, the rollers travel in the arc of a circle, the center of which is in the axis of the king pin.

The coupling includes a housing 62 suitably secured to the end member 50. The housing is bifurcated as at 64, and pivotally connected in the bifurcated portion are corresponding oppositely disposed jaws 66 arranged for the reception of the king pin. The jaws are so mounted on pivots 67 that they automatically embrace and release the king pin as the king pin is inserted and removed.

When the king pin is embraced by the jaws, a dog automatically swings into position to lock the jaws against movement. This dog includes a shaft 68 having thereon corresponding bell crank levers 70 adapted to engage notches 72 in the jaws, and pivotally connected to the bell crank levers is a yoke 74 embracing the king pin immediately above the yoke 40.

When it is desired to uncouple the trailer, the hand lever 46 is operated to apply force through the rod 44 to the bell crank lever 38, resulting in moving the bell crank lever through an angle, and this movement of the bell crank lever is transmitted through the yoke 74 to the bell crank levers 70 to disengage these levers from the jaws 66 so that the jaws may automatically swing to open position upon removal of the king pin.

The brake structure includes a shaft 76 journaled in a bracket on the housing 62 parallel to the front member 50 of the trailer frame. This shaft has arms 78 upon its respective ends connected as by rods 80 to the operating levers of the brakes 60, and toggles 82 are connected to the rods. The purpose of these toggles is to release the brakes on the trailer when it is desired to move the trailer from its previously parked position. The shaft also has suitably secured thereto a lever 84 engaging the thrust pin 20.

When force is applied to the foot pedal lever 30, the bell crank lever 24 is actuated to move the thrust pin 20, and this movement of the thrust pin actuates the lever 84, resulting in rocking the shaft 76 and thereby applying force through the arms 78 and the rods 80 to the operating lever of the brakes 60, resulting in effectively applying the brakes.

When uncoupling the trailer from the tractor, it is highly desirable that the brakes be automatically applied, and to this end a lever 86 is mounted for rotation on the shaft 76. This lever is confined in a yoke 88 on the lever 84, and a relatively heavy compression spring 90 is interposed between the lever 86 and one end of the yoke. This spring cooperates with the lever 84, and to provide for regulation of the tension of the spring 90 the yoke 88 has mounted therein for travel a set screw 92 abutting a cap 94 on the spring.

Upon the free end of the lever 86 is a roller 96 cooperating with a cam 98 pivoted on the housing 62. This cam is operable by a lever 100 connected by a link 102 to the arm 103 carried by one of the jaws 66. When the jaws are swung about their pivot 67 to embrace the king pin by the introduction of the pin between the jaws, the cam is moved to release the applied force on the lever 86, resulting in releasing the brakes, and when the jaws are opened by the removal of the king pin, the cam is moved through the lever 100 and link 102 to actuate the lever 86, and this movement or the lever 86 is transmitted through the spring 90 to the lever 84, resulting in rocking the shaft 76 and thereby applying the brakes 60.

Should the applied force prove insufficient or in excess, it may be varied by regulating the tension on the spring 90. Another important function of the spring is that it compensates for any variations in the effectiveness of the brakes which may be due to their having been applied over a considerable period of time.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is,—

1. In a brake system for a trailer, in combination with a rock shaft, an actuating lever therefor, means for actuating the lever, arms on the shaft, brake structures, rods connecting the brake structures to the arms, and a coupling for the trailer including movable jaws, of an auxiliary lever journaled on the shaft, a spring interposed between the levers, a cam for actuating the auxiliary lever, and means connecting the cam to one of the jaws for concomitant movement.

2. In a brake system for a trailer, in combination with a rock shaft, an actuating lever therefor, means for actuating the lever, arms on the shaft, brake structures, means connecting the brake structures to the arms, said means including mechanism for rendering said actuating lever ineffectual to apply said brake structures, and a coupling for the trailer including movable jaws, of an auxiliary lever journaled on the shaft, a spring interposed between the levers, a cam for actuating the auxiliary lever, and means connecting the cam to one of the jaws for concomitant movement.

ANDREW O. McCOLLUM.